(12) United States Patent
Prahlad et al.

(10) Patent No.: US 8,166,263 B2
(45) Date of Patent: Apr. 24, 2012

(54) CONTINUOUS DATA PROTECTION OVER INTERMITTENT CONNECTIONS, SUCH AS CONTINUOUS DATA BACKUP FOR LAPTOPS OR WIRELESS DEVICES

(75) Inventors: Anand Prahlad, East Brunswick, NJ (US); Vijay H. Agrawal, Eatontown, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 937 days.

(21) Appl. No.: 12/167,933

(22) Filed: Jul. 3, 2008

(65) Prior Publication Data

US 2010/0005259 A1    Jan. 7, 2010

(51) Int. Cl.
G06F 12/00 (2006.01)
G06F 7/00 (2006.01)

(52) U.S. Cl. ................. 711/162; 707/610; 711/E12.103
(58) Field of Classification Search .................. None
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |

(Continued)

FOREIGN PATENT DOCUMENTS

EP    0259912    3/1988

(Continued)

OTHER PUBLICATIONS

U.S. Appl. No. 12/626,839, filed Nov. 27, 2009, Klose, Michael F.

(Continued)

*Primary Examiner* — Reginald Bragdon
*Assistant Examiner* — Aracelis Ruiz
(74) *Attorney, Agent, or Firm* — Perkins Coie LLP

(57) ABSTRACT

A portable data protection system is described for protecting, transferring or copying data using continuous data protection (CDP) over intermittent or occasional connections between a computer system or mobile device containing the data to be protected, transferred or copied, called a data source, and one or more computer systems that receive the data, called a data target. CDP can be broken down logically into two phases: 1) detecting changes to data on a data source and 2) replicating the changes to a data target. The portable data protection system uses a method that performs the first phase continuously or near continuously on the data source, and the second phase when a connection is available between the data source and the data target.

15 Claims, 6 Drawing Sheets

U.S. PATENT DOCUMENTS

| | | | |
|---|---|---|---|
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,822,780 A | 10/1998 | Schutzman |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,125,369 A * | 9/2000 | Wu et al. | 707/613 |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 * | 11/2001 | Alam et al. | 1/1 |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,513,051 B1 | 1/2003 | Bolosky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,183 B2 | 8/2003 | Ohran |
| 6,609,187 B1 | 8/2003 | Merrell et al. |
| 6,658,526 B2 | 12/2003 | Nguyen et al. |
| 6,704,730 B2 | 3/2004 | Moulton et al. |
| 6,745,304 B2 | 6/2004 | Playe |
| 6,757,699 B2 | 6/2004 | Lowry |
| 6,757,794 B2 | 6/2004 | Cabrera et al. |
| 6,795,903 B2 | 9/2004 | Schultz et al. |
| 6,810,398 B2 | 10/2004 | Moulton |
| 6,868,417 B2 | 3/2005 | Kazar et al. |
| 6,901,493 B1 | 5/2005 | Maffezzoni |
| 6,928,459 B1 | 8/2005 | Sawdon et al. |
| 6,952,758 B2 | 10/2005 | Chron et al. |
| 6,959,368 B1 | 10/2005 | St. Pierre et al. |
| 6,976,039 B2 | 12/2005 | Chefalas et al. |
| 6,993,162 B2 | 1/2006 | Stephany et al. |
| 7,017,113 B2 | 3/2006 | Bourbakis et al. |
| 7,035,943 B2 | 4/2006 | Yamane et al. |
| 7,089,395 B2 | 8/2006 | Jacobson et al. |
| 7,111,173 B1 | 9/2006 | Scheidt |
| 7,117,246 B2 | 10/2006 | Christenson et al. |
| 7,143,091 B2 | 11/2006 | Charnock et al. |
| 7,191,290 B1 | 3/2007 | Ackaouy et al. |
| 7,200,604 B2 | 4/2007 | Forman et al. |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,320,059 B1 | 1/2008 | Armangau et al. |
| 7,325,110 B2 | 1/2008 | Kubo et al. |
| 7,395,282 B1 | 7/2008 | Crescenti et al. |
| 7,444,382 B2 | 10/2008 | Malik |
| 7,444,387 B2 | 10/2008 | Douceur et al. |
| 7,478,113 B1 | 1/2009 | De Spiegeleer et al. |
| 7,487,245 B2 | 2/2009 | Douceur et al. |
| 7,496,604 B2 | 2/2009 | Sutton, Jr. et al. |
| 7,647,462 B2 | 1/2010 | Wolfgang et al. |
| 7,661,028 B2 | 2/2010 | Erofeev |
| 7,676,590 B2 * | 3/2010 | Silverman et al. | 709/231 |
| 7,685,177 B1 | 3/2010 | Hagerstrom et al. |
| 7,685,459 B1 | 3/2010 | De Spiegeleer et al. |
| 7,698,699 B2 | 4/2010 | Rogers et al. |
| 7,814,142 B2 | 10/2010 | Mamou et al. |
| 7,870,486 B2 | 1/2011 | Wang et al. |
| 2001/0027494 A1 * | 10/2001 | Deo et al. | 709/247 |
| 2002/0099806 A1 | 7/2002 | Balsamo et al. |
| 2002/0107877 A1 | 8/2002 | Whiting et al. |
| 2003/0033308 A1 | 2/2003 | Patel et al. |
| 2003/0110190 A1 | 6/2003 | Achiwa et al. |
| 2003/0167318 A1 * | 9/2003 | Robbin et al. | 709/221 |
| 2004/0148306 A1 | 7/2004 | Moulton et al. |
| 2004/0230817 A1 | 11/2004 | Ma |
| 2004/0250033 A1 | 12/2004 | Prahlad et al. |
| 2005/0033756 A1 | 2/2005 | Kottomtharayil et al. |
| 2005/0066190 A1 | 3/2005 | Martin |
| 2005/0086443 A1 | 4/2005 | Mizuno et al. |
| 2005/0114406 A1 | 5/2005 | Borthakur et al. |
| 2005/0131900 A1 | 6/2005 | Palliyll et al. |
| 2005/0203864 A1 | 9/2005 | Schmidt et al. |
| 2005/0234823 A1 | 10/2005 | Schimpf |
| 2005/0262097 A1 | 11/2005 | Sim-Tang et al. |
| 2006/0005048 A1 | 1/2006 | Osaki et al. |
| 2006/0010227 A1 | 1/2006 | Atluri |
| 2006/0047894 A1 | 3/2006 | Okumura |
| 2006/0053305 A1 | 3/2006 | Wahlert et al. |
| 2006/0056623 A1 | 3/2006 | Gligor et al. |
| 2006/0174112 A1 | 8/2006 | Wray |
| 2006/0224846 A1 | 10/2006 | Amarendran et al. |
| 2006/0230244 A1 | 10/2006 | Amarendran et al. |
| 2006/0242489 A1 | 10/2006 | Brockway et al. |
| 2007/0022145 A1 | 1/2007 | Kavuri |
| 2007/0118705 A1 | 5/2007 | Arakawa et al. |
| 2007/0179995 A1 | 8/2007 | Prahlad et al. |
| 2007/0198613 A1 | 8/2007 | Prahlad et al. |
| 2007/0203937 A1 | 8/2007 | Prahlad et al. |
| 2007/0255758 A1 | 11/2007 | Zheng et al. |
| 2008/0028007 A1 | 1/2008 | Ishii et al. |
| 2008/0098083 A1 | 4/2008 | Shergill et al. |
| 2008/0162320 A1 | 7/2008 | Mueller et al. |
| 2008/0162518 A1 | 7/2008 | Bollinger et al. |
| 2009/0063528 A1 | 3/2009 | Yueh |
| 2009/0106480 A1 | 4/2009 | Chung |
| 2009/0112870 A1 | 4/2009 | Ozzie et al. |
| 2009/0132619 A1 | 5/2009 | Arakawa et al. |
| 2009/0144285 A1 | 6/2009 | Chatley et al. |
| 2009/0177719 A1 | 7/2009 | Kavuri |
| 2009/0204649 A1 | 8/2009 | Wong et al. |
| 2010/0094817 A1 | 4/2010 | Ben-Shaul et al. |
| 2010/0161554 A1 | 6/2010 | Datuashvili et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |

| | | |
|---|---|---|
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Diligent Technologies "HyperFactor," <http://www.diligent.com/products:protecTIER-1:HyperFactor-1>, Internet accessed on Dec. 5, 2008, 2 pages.

Overland Storage, "Data Deduplication," <http://www.overlandstorage.com/topics/data_deduplication.html>, Internet accessed on Dec. 5, 2008, 2 pages.

Lortu Software Development, "Kondar Technology-Deduplication," <http://www.lortu.com/en/deduplication.asp>, Internet accessed on Dec. 5, 2008, 3 pages.

Quantum Corporation, "Data De-Duplication Background: A Technical White Paper," May 2008, 13 pages.

Kornblum, Jesse, "Identifying Almost Identical Files Using Context Triggered Piecewise Hashing," www.sciencedirect.com, Digital Investigation 3S (2006), pp. S91-S97.

International Search Report and Written Opinion, International Application No. PCT/US2009/58137, Mail Date Dec. 23, 2009, 14 pages.

U.S. Appl. No. 12/647,906, filed Dec. 28, 2009, Attarde et al.
U.S. Appl. No. 12/649,454, filed Dec. 30, 2009, Muller et al.
CommVault Systems, Inc., "Deduplication," <http://documentation.commvault.com/commvault/release_8_0_0/books_online_1/english_US/features/single_instance/single_instance.htm>, internet accessed on May 21, 2009, 9 pages.

CommVault Systems, Inc., "Deduplication—How To," <http://documentation.commvault.com/commvault/release_8_0_0/books_online_1/english_US/features/single_instance/single_instance_how_to.htm>, internet accessed on May 21, 2009, 7 pages.

U.S. Appl. No. 12/565,576, filed Sep. 23, 2009, Kottomtharayil et al.
U.S. Appl. No. 11/950,376, filed Dec. 4, 2007, Bunte et al.
U.S. Appl. No. 11/963,623, filed Dec. 21, 2007, Gokhale et al.
U.S. Appl. No. 12/058,178, filed Mar. 28, 2008, Prahlad et al.
U.S. Appl. No. 12/058,317, filed Mar. 28, 2008, Prahlad et al.
U.S. Appl. No. 12/058,367, filed Mar. 28, 2008, Prahlad et al.
U.S. Appl. No. 12/145,342, filed Jun. 24, 2008, Gokhale.
U.S. Appl. No. 12/145,347, filed Jun. 24, 2008, Gokhale.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

Commvault Systems, Inc., "Continuous Data Replicator 7.0," Product Data Sheet, 2007.

U.S. Appl. No. 13/251,022, filed Sep. 30, 2011, Gokhale.

Federal Information Processing Standards Publication 180-2, "Secure Hash Standard", Aug. 1, 2002, <http://csrc.nist.gov/publications/fips/fipsl 80-2/fips 1 80-2withchangenotice. pdf>, 83 pages.

Menezes et al., "Handbook of Applied Cryptography", CRC Press, 1996, <http://www.cacr.math.uwaterloo.ca/hac/aboutlchap9.pdf>, 64 pages.

Microsoft, "Computer Dictionary", Fifth Edition, 2002, 3 pages.

SearchStorage, "File System", Nov. 1998, <http://searchstorage.techtarget.com/definition/file-system>, 10 pages.

Webopedia, "Data Duplication", Aug. 31, 2006, <http://web.archive.org/web/20060913030559/http://www.webopedia.com/TERMID/data_deduplication.html>, 2 pages.

* cited by examiner

CONTINUOUS DATA PROTECTION OVER INTERMITTENT CONNECTIONS, SUCH AS CONTINUOUS DATA BACKUP FOR LAPTOPS OR WIRELESS DEVICES

BACKGROUND

Computer systems contain large amounts of information. This information includes personal information, such as financial information, customer/client/patient contact information, business information, audio/visual information, and much more. This information also includes information related to the correct operation of the computer system, such as operating system files, application files, user settings, and so on. With the increased reliance on computer systems to store critical information, the importance of protecting information has grown. Traditional storage systems receive an identification of a file to protect, and then create one or more secondary copies, such as backup files, containing the contents of the file. These secondary copies can then later be used to restore the original data should anything happen to the original data.

In corporate environments, protecting information is generally part of a routine process that information technologists perform for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

Continuous data protection (CDP), also sometimes called continuous data replication (CDR) or continuous backup, refers to protecting computer data by automatically saving a copy of every change made to that data, essentially capturing every version of the data that a user or process saves. CDP allows the user or an administrator to restore data to any point in time, at the point of any change. There are multiple methods known in the art for capturing the continuous changes involving different technologies that serve different needs. CDP-based solutions can provide fine granularities of restorable objects ranging from disk images to logical data objects such as files, mailboxes, messages, database files, and database logs. CDP is different from traditional backup in that it is not necessary to specify the point in time to which to recover data until a restore is about to be performed. Traditional backups can only restore data to the point at which the backup was taken. With CDP, there are no backup schedules. When data is written to disk, it is also asynchronously written to a second location, usually another computer over the network. In many situations, CDP requires less space on backup media (e.g., disk or tape) than traditional backup. Most CDP solutions save byte or block-level differences rather than file-level differences. This means that if a change is made to one byte of a 100 GB file, only the changed byte or block is backed up, whereas traditional incremental and differential backups make copies of entire files when those files change.

CDP typically relies upon a highly reliable, continuous connection between the computer system containing data to be protected and the data storage system so that each change to data can be replicated between the computer system and the data storage system when it happens. However, many computers in an organization are not continuously connected, but still contain important data that needs protection. For example, laptops, cell phones, tablet PCs, smart appliances, and other types of portable computer systems may only be connected to the network once a day or once a week, such as after a business trip or when the user is at a wireless hot spot. Even when these computer systems are connected, CDP is often a poor choice for protecting data because the input/output (I/O) performance for constantly replicating writes from these devices is very bad. Typically, such computer systems are either not protected or are protected through slower or less convenient data protection technologies, such as disk imaging, traditional full or incremental backups, and so forth. The use of different types of data protection throughout an organization leads to additional administrative burden for already overloaded information technology (IT) personnel and resources.

The foregoing examples of some existing limitations are intended to be illustrative and not exclusive. Other limitations will become apparent to those of skill in the art upon a reading of the Detailed Description below. These and other problems exist with respect to data storage management systems.

Figure 1:
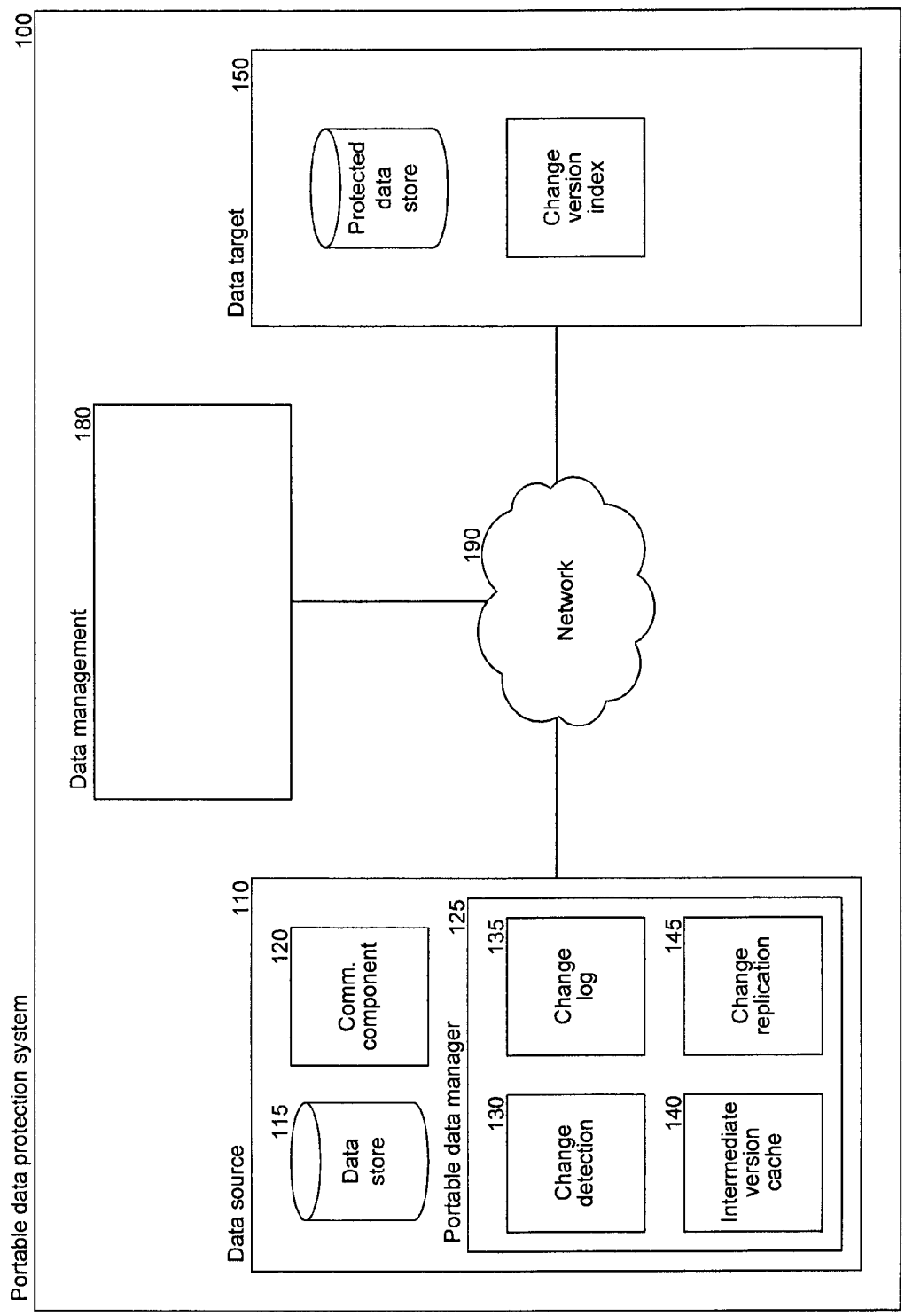
FIG. 1 is a block diagram that illustrates components of a portable data protection system in one embodiment.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

The headings provided herein are for convenience only and do not necessarily affect the scope or meaning of the claimed invention.

Overview

Described in detail herein is a portable data protection system for protecting, transferring or copying data using CDP over intermittent or occasional connections between a computer system containing the data to be protected, transferred or copied, called a data source, and one or more computer systems that receive the data, called a data target. For example, the portable data protection system provides methods for protecting, transferring or copying data on laptops using a traditional data storage server.

One problem with traditional CDP is that it requires a data source to be continuously connected to a network so that data can be continuously transferred and replicated to a data target. With laptops or other mobile devices that are only sporadically connected to a network, traditional CDP may not work. This is because traditional CDP would typically store in a buffer or cache a queue of data that is to be protected, transferred or copied to the data target. For example, if a traditional CDP filter is installed on a laptop and if the buffer or cache size is fixed, then the buffer or cache storing the queue of data could fill up too quickly if the laptop is not coupled to the network often enough. If the buffer or cache is filled, then the advantages offered by CDP would be lost, because the laptop would no longer be able to queue data that is to be protected, transferred or copied to the data target. As another example, if a traditional CDP filter is installed on a laptop and if the buffer or cache is configured to grow in size, then the buffer or cache could grow to consume all or a substantial potion of all available storage space on the laptop if the laptop is not coupled to the network often enough. This may interfere with other use of the laptop.

The portable data protection system overcomes I/O performance problems associated with constantly replicating writes in portable or other intermittently connected devices. In some embodiments, the portable data protection system employs a CDP filter, program code or module to minimally monitor a particular file or files, and to journal or track changes such that only the most recent changes to the particular file or files are retained within the buffer or cache. For example, the portable data protection system may employ a bitmap or bit-level log of changes to journal or track changes to the particular file or files on the portable device. Then, when the portable device is coupled to the network, the portable data protection system uses the bitmap or bit-level log of changes to determine the particular file or files that have been changed. The portable data protection system then provides those recent changes using CDP functionality to the data target. Because the portable data protection system journals or tracks only the most recent changes to the particular file or files, the portable data protection system can reduce the amount of data to be queued in the buffer or cache that is to be replicated to the data target. The portable data protection system can avoid filling up the buffer or cache, thereby saving storage space on the portable device.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

System Components

FIG. 1 and the discussion herein provide a brief, general description of a suitable computing environment in which the invention can be implemented. Although not required, aspects of the invention are described in the general context of computer-executable instructions, such as routines executed by a general-purpose computer, e.g., a server computer, wireless device, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention may reside on a server computer, while corresponding portions reside on a client computer such as a mobile or portable device, and thus, while certain hardware platforms are described herein, aspects of the invention are equally applicable to nodes on a network.

FIG. 1 is a block diagram that illustrates components of a portable data protection system 100 in one embodiment. The portable data protection system 100 contains a data source 110, a data target 150 and a network 190. The portable data protection system 100 may also contain a data management computer system 180 that oversees the protection, transfer or copying of data between the data source 110 and the data target 150.

The data source 110 contains a data store 115, a communication component 120, and a portable data manager 125. The data store 115 stores source data. The source data may include files, application-specific data, databases, or other physical or logical data objects. The data store 115 may be a hard drive, optical disk, flash drive, solid state drive, semiconductor memory, or any other device that stores data or provides access to stored data. The communication component 120 is a device, such as an Ethernet card, wireless device, modem, ISDN terminal adapter or the like, that allows the data source 110 to communicate with the data target 150. The communication component 120 forms a connection over the network 190, which may be a public network, such as the Internet, a private network, such as a local area network (LAN), or a combination of the two, such as a tunneled private connection over a public network (e.g., using the Point to Point Tunneling Protocol (PPTP)).

The portable data manager 125 contains a change detection component 130, a change log component 135, an intermediate version cache 140 and a change replication component 145. The portable data manager 125, described in further detail herein, is a software and/or hardware component that detects changes to source data, keeps a log of the changes, keeps a copy of the original data prior to the change and interacts with the data target 150 when a connection is available to protect, copy or transfer the changed data. The change detection component 130 detects changes to data in the data store 115. For example, if a user edits a document or changes operating system settings, then a file (or a portion of a file, e.g., a data block) on the hard drive or at a memory location may be modified. The change detection component 130 may use snapshot software (e.g., built into the operating system), journaling software, a file system filter driver, an application event, or other common method of detecting changes to data, as described in greater detail below.

When the change detection component 130 detects a change to data in the data store 115, the change log component 135 stores a record of the change, such as a name or an identifier of the changed data, an offset within the changed data beginning at which the change is made, and the bytes that changed. The intermediate file cache component 140 stores any intermediate data so that a user can recover data at any point in time. In some embodiments, the change log component 135 stores the latest version of the changed data and the intermediate file cache component 140 stores any previous versions of the changed data. In some embodiments, the portable data protection system 100 does not store the original version of the data prior to the first change under the assumption that the data target 150 already has this original version of the data from the last time the data source 110 was connected to the data target 150.

In some embodiments, the portable data protection system 100 may not store the version of the data after the most recent change (e.g., the last change before the data source 110 is connected or reconnected to the data target 150) because this version of the data is available from the data store 115 of the data source 110. The portable data protection system 100 may implement this by caching a version of the data after each change to the data. When the data is changed again (i.e., creating a subsequent version of the data), the portable data protection system 100 flushes the version of the data in the cache to the intermediate file cache component 140 and then caches the subsequent version of the data. When the data source 110 is connected or reconnected to the data target 150, the portable data protection system 100 can empty the data in the cache.

When the data source 110 is connected to the network 190, the change replication component 145 copies information stored by the change log component 135 and the intermediate version cache component 140 to the data target 150. In some embodiments, in order to save data storage space on the data source 110, the data source 110 does not include the intermediate version cache component 140 and therefore, the data source 110 does not store any previous versions of the changed data. In some embodiments, the data source 110 includes the intermediate version cache component 140, but limits its storage capacity to a threshold storage limit. For example, the data source 110 may limit the intermediate version cache component 140 to storing the first 100 MB or last 100 MB of changes to data in the data store 115.

In some embodiments, the data management computer system 180 determines when the data source 110 is accessible (i.e., when the data source 110 is connected to the network 190), and manages the copying of data from the data source 110 to the data target 150. For example, the data management computer system 180 may receive an indication from the portable data manager 125 when the data source 110 is connected to the network 190 (e.g., to a corporate network) The data management computer system 180 may then direct the data source 110 to transfer or copy any changed data to the data target 150. The data source 110 may do this by exporting the contents of the change log 135 and the intermediate version cache 140.

CDP can be broken down logically into two phases: 1) detecting changes to data on a data source and 2) replicating the changes to a data target. The portable data protection system uses a method that performs the first phase continuously or near continuously on the data source, and the second phase when a connection is available between the data source and the data target.

Figure 3:
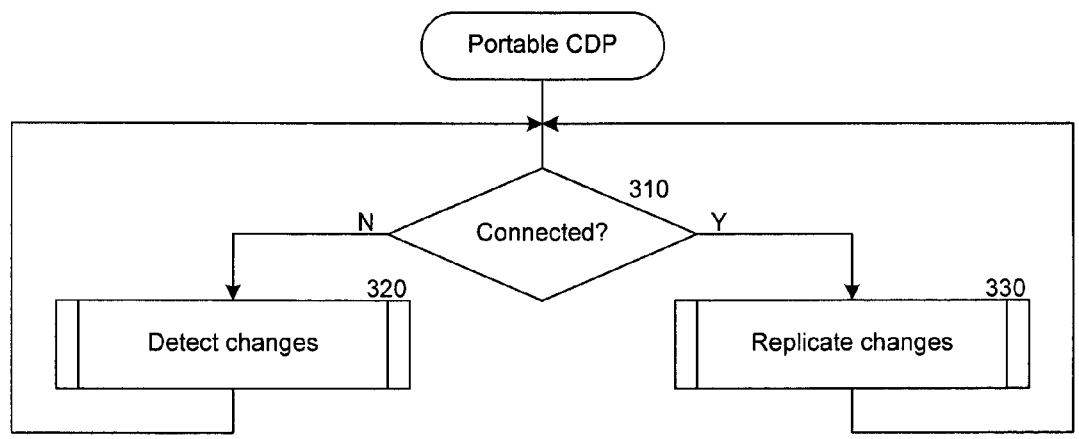
FIG. 3 is a block diagram that illustrates an overall CDP process performed by the portable data protection system in one embodiment.
Figure 4:
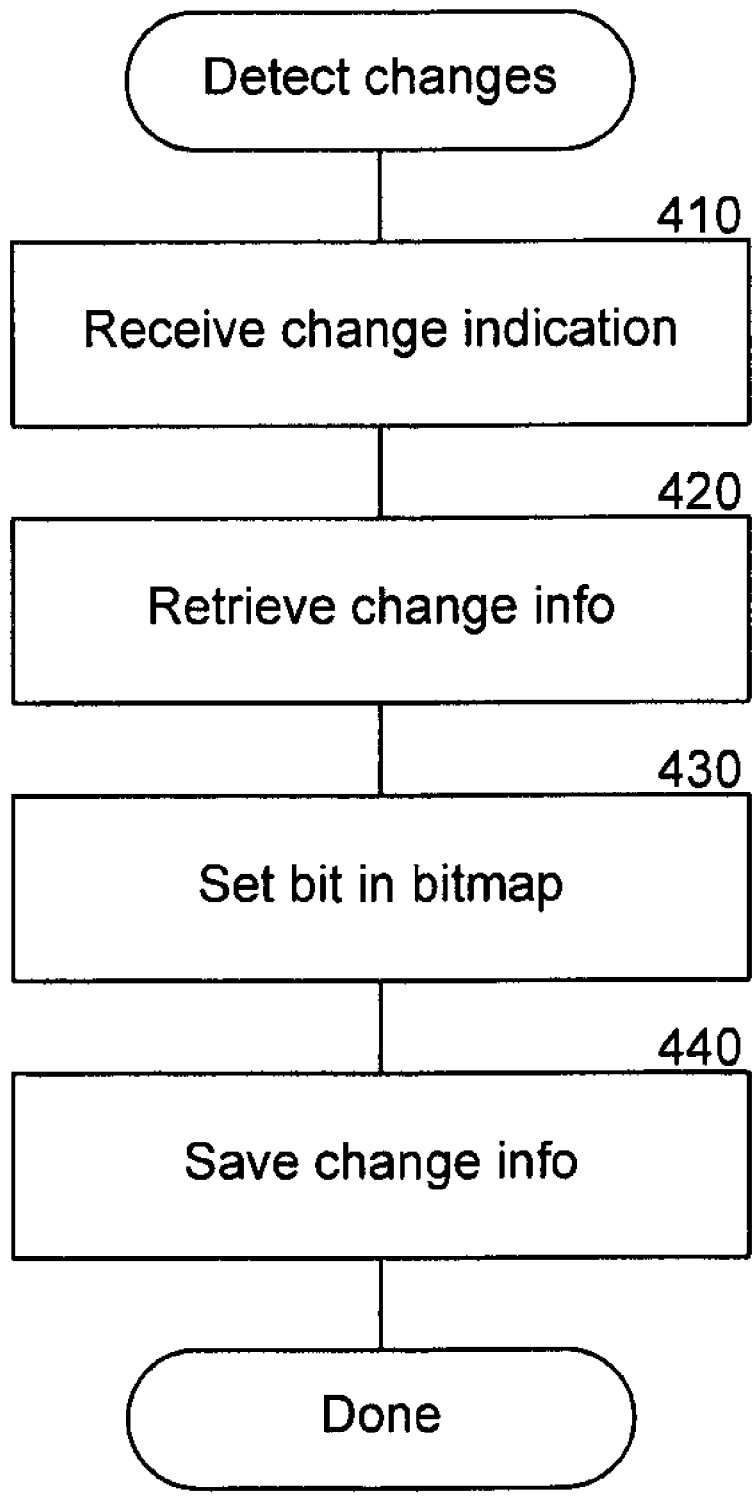
FIG. 4 is a flow diagram that illustrates a change-detecting phase of the CDP process used by the portable data protection system in one embodiment.
Figure 5:
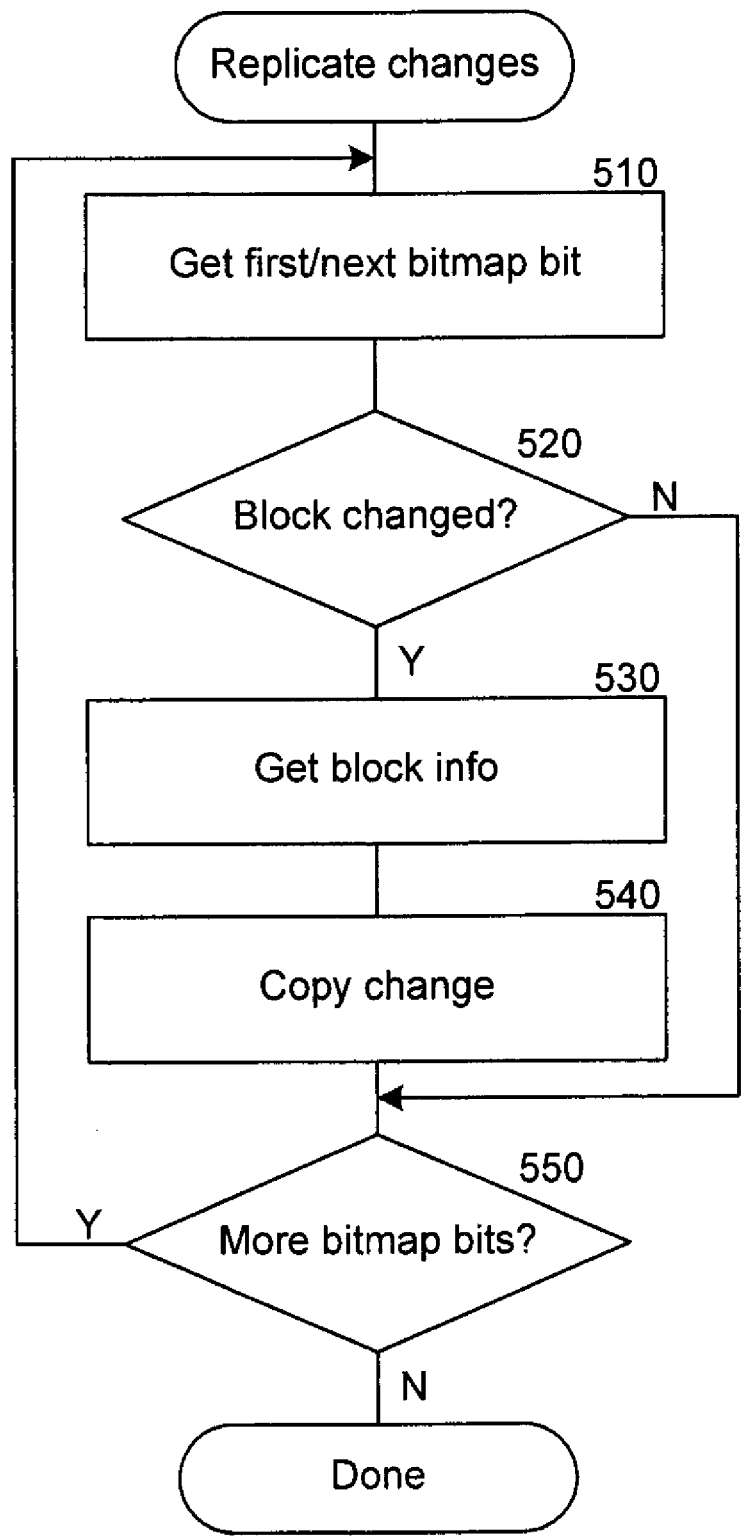
FIG. 5 is a flow diagram that illustrates a data-replicating phase of the CDP process used by the portable data protection system in one embodiment.

FIGS. 3-5 are representative flow diagrams that depict processes used in some embodiments. These flow diagrams do not show all functions or exchanges of data, but instead they provide an understanding of commands and data exchanged under the portable data protection system 100. Those skilled in the relevant art will recognize that some functions or exchange of commands and data may be repeated, varied, omitted, or supplemented, and other (less important) aspects not shown may be readily implemented.

FIG. 3 is a block diagram that illustrates the overall CDP process performed by the portable data protection system 100. In decision block 310, if the data source 110 is connected to the network 190, over which it can communicate with the data target 150, then the portable data protection system 100 continues at block 330, else the portable data protection system 100 continues at block 320. In block 320, the portable data protection system 100 detects changes to the data stored at the data source 110 as described further with reference to FIG. 4. This represents the first phase of the CDP process. In block 330, the portable data protection system 100 replicates any changes to the data target 150 as described further with reference to FIG. 5. This represents the second phase of the CDP process. The portable data protection system 100 then loops to block 310 and repeats the process. This process is repeated through many cycles of changes and cycles of the data source 110 being connected and disconnected from the network 190.

Detecting Changes

This section describes the first phase of the CDP process, detecting changes. Under the present system, a CDP filter, program code or module on the data source 110 tracks bit-level changes to a file or volume. For example, the CDP filter, program code or module employs snapshot functionality (i.e., the CDP filter, program code or module creates a snapshot at every instant in time a modification to the file or volume occurs, either just prior to or just after the modification) to track bit-level changes to a file or volume. The CDP filter, program code or module employs a bitmap to track and identify which blocks have been changed on various locally stored files or volumes. Notably, the portable data protection system 100 sets flags for files that have been modified and tracks recent changes, including overwriting old changes with new changes, so as to not fill up the change log component 135.

An administrator (or other user) may configure for how long the portable data protection system 100 is to track changes to files or volumes. For example, an administrator may configure the portable data protection system 100 to only track the 100 most recent changes for a particular file. When the particular file has been changed for the 101st time, the portable data protection system 100 would discard the first change to the particular file, and upon the 102nd change, the portable data protection system 100 would discard the second change to the particular file. As another example, an administrator may configure the portable data protection system 100 to only track changes to a file that have occurred in the past three days of no network connectivity. If the data source 110 is offline for a fourth day and if the file was changed subsequent to the first day, then the portable data protection system 100 would discard changes that occurred to the file on the first day. If the data source 110 is offline for the fourth day and if the file had not changed subsequent to the first day, then the data protection system 100 would not discard changes that occurred to the file on the first day. Because the portable data protection system 100 tracks only recent changes to the files, the portable data protection system 100 can reduce the amount of data to be stored in the change log component 135 that is to be replicated to the data target. The portable data protection system can avoid filling up the change log component 135, thereby saving storage space on the data source 110.

Then, when the data source 110 connects to the network 190, the data target 150 may provide a message to the data source 110 indicating a last modification time of a file that has been changed. In response, the CDP process retrieves changes in the change log component 135 from the last modification time to the present and provides those changes to the data target 150. The flag, for example, can be a single bit that represents a 16K to 32K block that has been changed, and then the change replication component 145 assesses the data store 115 for files to pick up or copy changed blocks based on those flags and provides them to the destination data store 150.

Figure 2A:
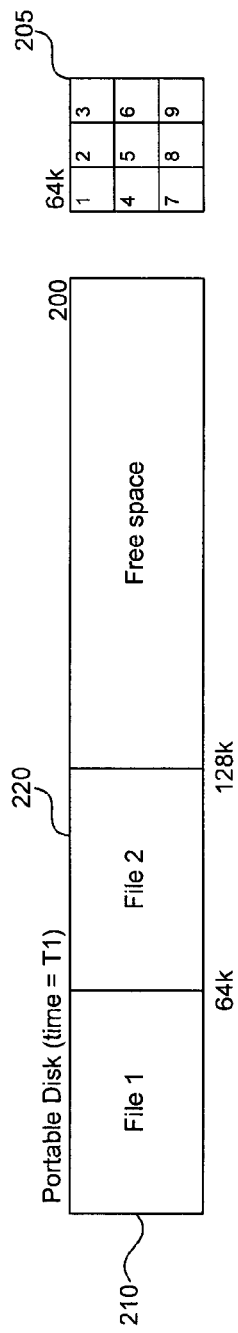
FIGS. 2A-2C are block diagrams that illustrate changing states of a portable data store in one embodiment.
Figure 2B:
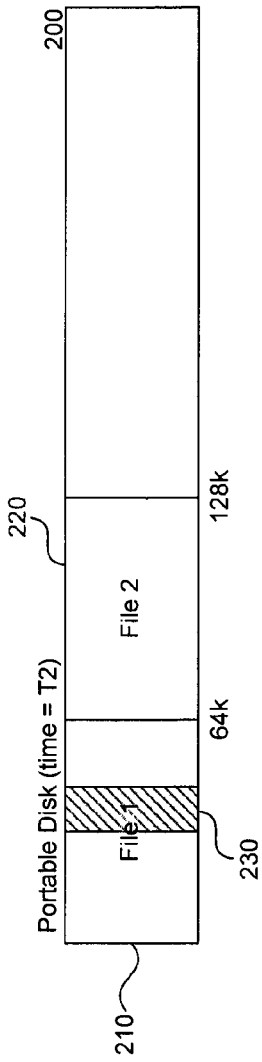
Figure 2C:
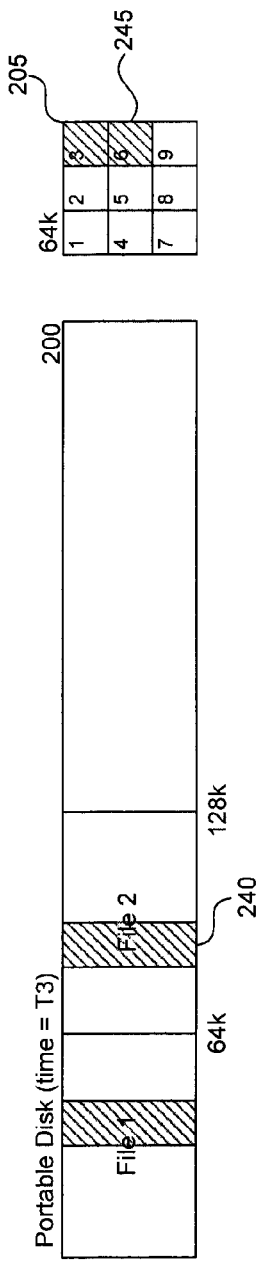

FIGS. 2A-2C illustrate some of the data structures that may be used by the portable data protection system 100. While the term "field" and "record" may be used herein, any type of data structure can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed herein.

FIGS. 2A-2C are block diagrams that illustrate the state of the data store 115 in one embodiment. FIG. 2A illustrates the contents of a disk 200 (e.g., the data store 115 is a hard disk drive—the disk 200) at time T1. A bitmap 205 contains a bit for each 16 k block of the disk 200 that is set when data in the associated block has changed (e.g. set to a zero (or one) value). At time T1, the data source 110 containing the disk 200 is not currently connected to the network 190. The disk 200 contains a first file 210 and a second file 220. FIG. 2B illustrates the contents of the disk 200 at time T2 after a 16 k block at offset 48 k has been modified. The shaded region 230 indicates the modified block on the disk 200, which may be represented by a zero (or one) in the bitmap. The bitmap 205 has the third bit 235 set because the modified block is the third 16 k block on the disk 200. The portable data protection system 100 may use a data structure (e.g., a file allocation table, a master file table or other data structure) of a file system of the disk 200 to determine the blocks on the disk 200 that correspond to the changes to the first file 210 and second file 220. Another data structure (such as a log, not shown in FIGS. 2A-2C) may also store the exact location of the change within the blocks and the previous value of the changed bytes or all data for that changed block.

FIG. 2C illustrates the contents of the disk 200 at time T3 after a second block has been modified at offset 80 k. The shaded region 240 indicates the modified block on the disk 200. The bitmap 205 has the sixth bit 245 set (in addition to the third bit set above) because the modified block is the sixth 16 k block on the disk 200. At some point after T3, the data source 110 containing the disk 200 is connected to the network 190. The data source 110 provides, or the data target 150 retrieves, an indication or map of data that has changed since the data source 110 was last connected to the network 190. For example, the data source 110 may send the bitmap 205, including any separate log, to the data target 150. As another example, instead of sending the bitmap 205, the data source 110 may parse the bitmap 205 and send data indicating which blocks have changed to the data target 150. Alternatively, the data target 150 may be a traditional CDP target, and the data source 110 may mimic the CDP replication messages that the data source 110 would have sent had the data source 110 been continuously connected to the data target 150 while the changes were made. For example, if the data source 110 has stored the n most recent changes to a file, the data source 110 may send a first CDP replication message to the data target 150 for the first stored change to the file, a second CDP replication message to the data target 150 for the second stored change to the file, and so on, up to a nth CDP replication message for the nth change to the file. This would enable the data target 150 to restore the file at the point of any of the n most recent changes to the file.

As noted above, one data structure, a bitmap, may indicate changed blocks, whereas another data structure may track the offsets and block lengths that were changed, so that only changed blocks or changed portions of blocks are copied to the data target 150.

In some embodiments, the portable data protection system 100 may employ snapshot functionality to track changes to a file or volume, at the block-level, byte-level or bit-level. For example, the portable data protection system 100 may create a snapshot at every instant in time a modification to the file or volume occurs. The portable data protection system 100 may create the snapshot just prior to or subsequent to the modification to the file or volume. The portable data protection system 100 may then perform block, byte or bit comparisons of snapshots to determine the changed blocks, bytes or bits of the file or volume. For example, the portable data protection system 100 may create a first snapshot of a file prior to any modifications to the file. After a first modification, the portable data protection system 100 may create a second snapshot and compare the first and second snapshots to determine that a first set of bytes within the file has changed. The portable data protection system 100 can then discard the first snapshot but retain the first set of bytes. Alternatively, the portable data protection system 100 can retain the first snapshot.

After a second modification, the portable data protection system 100 may create a third snapshot and compare the second and third snapshots to determine that a second set of bytes within the file has changed. The portable data protection system 100 can then discard the second snapshot, but retain the second set of bytes. Alternatively, the portable data protection system 100 can retain the second snapshot. The portable data protection system 100 can then determine that the union of the first and second sets of bytes comprise the changed bytes for the file. The portable data protection system 100 can then use a data structure (e.g., a bitmap) to store an indication of the changed bytes. The usage of snapshots by the portable data protection system 100 in this manner enables the portable data protection system 100 to save storage space on the data source 110.

The portable data protection system 100 may use snapshots in other manners, such as by taking snapshots on a periodic basis or other basis. For example, the portable data protection system 100 may create a first snapshot of a file prior to any modifications to the file. The portable data protection system 100 may take a second snapshot of the file when the data source 110 is connected to the network 190 and to the data target 150. The portable data protection system 100 may then compare the first and second snapshots to determine the set of bytes within the file that have changed. The portable data protection system 100 can then use a data structure (e.g., a bitmap) to store an indication of the changed bytes.

FIG. 4 is a flow diagram that illustrates the change-detecting phase of the CDP process used by the portable data protection system 100 in one embodiment. In block 410, the change detection component 130 receives an indication of a change to data stored in a data store at a data source. In block 420, the change detection component 130 retrieves any additional information about the change. For example, the change detection component 130 may retrieve the blocks that changed, the affected file(s), the offsets within each block or file that changed, the length of the change, any metadata associated with the changed data (e.g., file metadata), the user that made the change, the time of the change, and so forth. In block 430, the change detection component 130 sets an appropriate bit in the bitmap described herein to indicate which blocks changed. In block 440, the change detection component 130 stores any additional change information, such as the blocks that changed, the previous data in the blocks, and so on.

In some embodiments, the portable data protection system 100 limits the amount of data stored on the data source 110 to avoid filling up the data storage available to the data source 110. For example, an administrator may configure the portable data protection system 100 to limit the size of the change log component 135 that stores data to be replicated to the data target 150. A data source 110 such as a laptop may have numerous files to be tracked, with an average of 100 modifications to the files per day and the average modification to a file being 1 MB. An administrator may configure the laptop to have a 200 MB change log component 135 for storing changed files. Each day that the laptop is not connected to the network will result in 100 MB of modifications to be stored in the change log component 135 (100 modifications×1 MB/modification=100 MB of modifications) on average. This means that the laptop can only store two days worth of modifications before filling up the change log component 135. However, such a size limitation of the change log component 135 may be preferable to tracking all changes to data on the laptop, which may result in consuming all available storage space on the laptop (depending upon the size and frequency of modifications, the length of time of no connectivity, and perhaps other factors).

As another example of how portable data protection system 100 limits the amount of data stored on the data source 110, the portable data protection system 100 may only keep a bitmap indicating changed blocks without a separate log of changes within blocks. This causes more data to be sent when the data source 110 is reconnected to the network 190 but uses less space when the data source 110 is not connected to the network 190. Other space saving measures may also be used, such as not storing the previous data of a changed block, using a larger block size in the bitmap to reduce the size of the bitmap, and not tracking all changes (e.g., for operating system files that should not change or less important data files). These space saving measures may be configurable by an administrator or user, and may be set to take effect only when needed. For example, the portable data protection system 100 may keep comprehensive information regarding all changes to files or volumes as long as space on the data store 115 is not low, but then incrementally apply space saving measures when space on the data store 115 is scarcer.

As another example of how portable data protection system 100 saves storage space on the data source 110, an administrator may configure the priority of files to be tracked. For example, a data source 110 such as a laptop may have its hard disk drive partitioned into two volumes, one for storing operating system files (e.g., files in the C:\Windows directory), and the second for storing user data (e.g., user-created spreadsheets, word processing documents, etc.). An administrator may configure the portable data protection system 100 to only journal or track the files on the second volume, as they are likely to be of higher priority and likely to change more frequently. As another example, the portable data protection system 100 may index files in the data store 115 and determine which files are to be journaled or tracked based upon information obtained during the indexing. The portable data protection system 100 may determine that files containing certain keywords (e.g., financial terms, names of key individuals, projects or departments) or files that have certain associated metadata (e.g., file metadata such as the creator of the file, by whom the file was last modified, etc.) are always to be journaled or tracked. Therefore, the portable data protection system 100 would store in the change log component 135 all changes to such files, and only store minimal or no changes to files that are deemed to be of lower priority.

Replicating Changes

As noted previously, CDP can be broken down logically into two phases: 1) detecting changes to data on a data source and 2) replicating the changes to a data target. The portable data protection system uses a method that performs the first phase continuously on the data source, and the second phase when a connection is available between the data source and data target. This section describes the second phase.

Under the present system, when the data source 110, after having been disconnected from the network 190, is reconnected to the network 190, the data source 110 copies changed data from the data source 110 to the data target 150. For example, the data source 110 may be a laptop computer or other portable computer system that is used by an employee of a company implementing the portable data protection system 100 while that employee travels or when the employee goes home each night. When the employee returns to work and connects the laptop to the network 190 (or when the employee has connectivity to the network 190 from afar), the portable data protection system 100 copies the changes from the laptop to a company data storage system (the data target 150). The data target 150 may be as simple as a backup disk or as complicated as an integrated data storage system including one or more media libraries and offsite facilities, and anything in between, such as a federated storage system or storage area network (SAN).

FIG. 5 is a flow diagram that illustrates the data-replicating phase of the CDP process used by the portable data protection system 100 in one embodiment. The process of detecting and storing changes in a bitmap has been described herein. In block 510, the change replication component 145 selects the first bit in the bitmap. In decision block 520, if the selected bit indicates that associated data blocks have changed, then the change replication component 145 continues at block 530, else the change replication component 145 continues at block 550. In block 530, the change replication component 145 retrieves information about the changed block. For example, the change replication component 145 may retrieve information from the change log component 135 or the intermediate version cache 140. In block 540, the change replication component 145 copies the change and associated information to the data target 150. The data target 150 may be designed to receive changes in the format stored by the data source 110, or the change replication component 145 may create messages in a format understood by the data target 150 based on the stored change information. For example, in one embodiment the data target 150 is a traditional CDP target, and the data source 110 sends traditional CDP messages (albeit later than they would have been sent had the data source 110 been continuously connected) based on the change information. For example, the change replication component 145 may accumulate all of the writes to a particular block and send a single write message to the CDP target indicating that a write to the block took place. In decision block 550, if there are more bits in the bitmap, then the change replication component 145 loops to block 510 to select the next bit, else the change replication component 145 completes.

In some embodiments, the portable data protection system 100 may operate in a dual mode. If the data source 110 is continually and consistently connected to the network 190 for a given period, then the data source 110 may switch to a traditional CDP mode where changes are sent continuously to the data target 150. When the data source 110 is disconnected from the network 190, the data source 110 switches to an intermittent CDP mode utilizing the other methods described herein and caches the changes locally at the data source 110 until the data source 110 is reconnected to the network 190.

The portable data protection system 100 may track information regarding how often and for how much time the data source 110 is disconnected from the network 190, in order to ascertain how and when to switch between a traditional CDP mode and the intermittent CDP mode. For example, based upon such monitoring the portable data protection system 100 may determine that the data source 110 is frequently disconnected from the network 190 every five days, for two days at a time (e.g, connected to the network 190 during the business week, but disconnected on the weekend.) Based upon this determination, the portable data protection system 100 may configure the portable data protection system 100 to use a traditional CDP mode during the five days that the data source 110 is connected to the network 190 and to switch to an intermittent CDP mode during the two days that the data source 110 is disconnected from the network 190.

The portable data protection system 100 may also track information about the connection to the network 190 (e.g., the speed and/or quality of the connection, whether the connection is through a tunneled private connection, whether the connection is directly to the same private or internal network as the data target 150, etc.), in order to aid in determining how and when to switch modes. For example, the data source 110 may have a low-speed connection to the network 190 (e.g., a dial-up connection or otherwise low-speed connection), and therefore the portable data protection system 100 should remain in the intermittent CDP mode. As another example, the data source 110 may have a tunneled private connection to the network 190 that is not suitable for a traditional CDP mode, and therefore the portable data protection system 100 should remain in the intermittent CDP mode. Those of skill in the art will understand that the portable data protection system 100 may consider other factors in determining how and when to switch modes.

Figure 6:
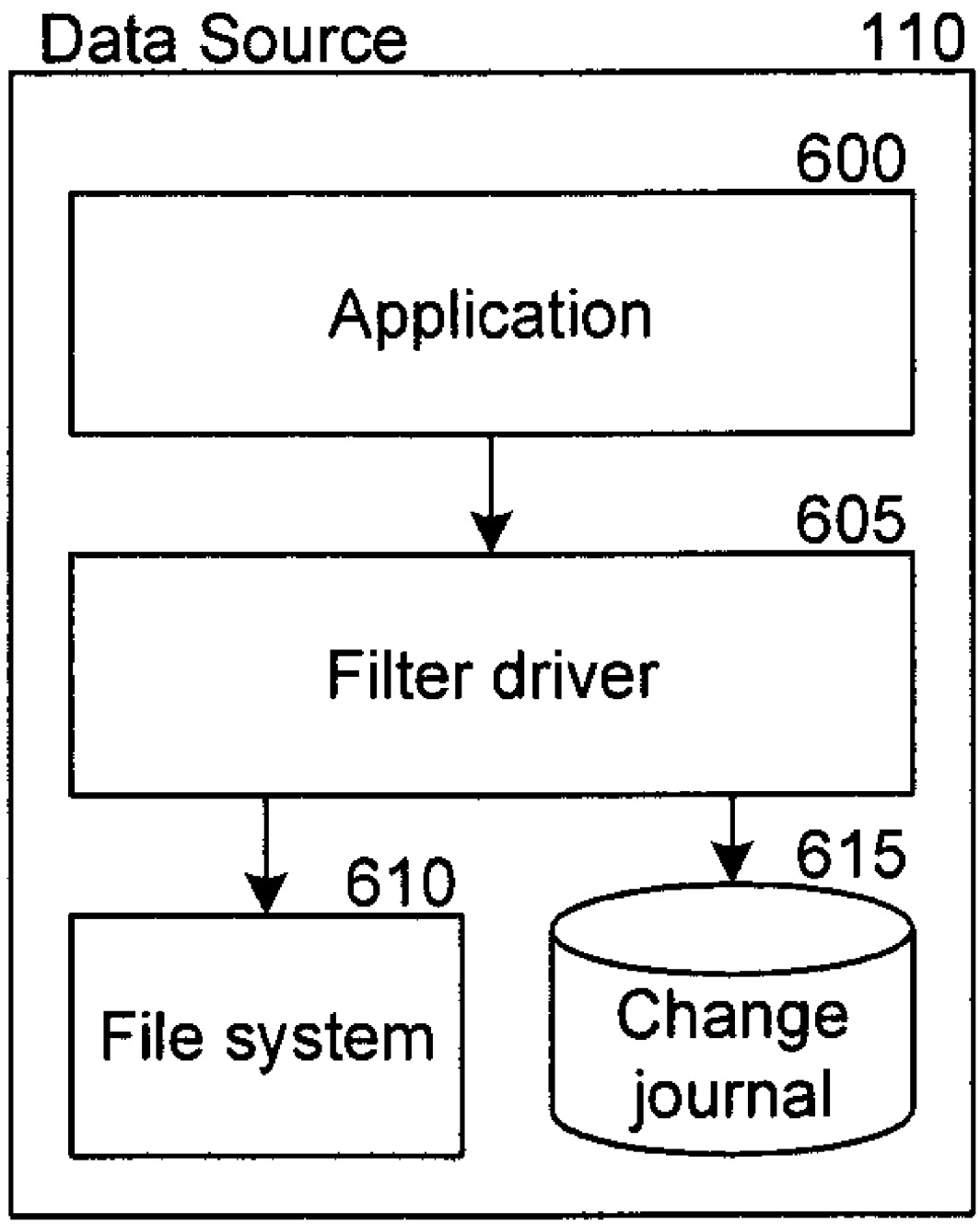
FIG. 6 is a block diagram that illustrates use of a change journal to track changes to files in one embodiment.

FIG. 6 is a block diagram that illustrates use of a change journal to track changes to files in one embodiment. As illustrated, the data source 110 includes an application 600 and a file system 610. The application 600 creates, modifies and/or deletes files stored on the file system 610. The data source 110 also includes a filter driver 605 (e.g., a kernel mode filter driver or similar filter driver that can intercept changes to files on the file system 610) and a change journal component 615. The filter driver 605 sits between the application 605 and the file system 610 and tracks changes made by the application 600 to files stored on the file system 610. The filter driver 605 tracks changes by intercepting calls to create, modify and/or delete files and logging such calls before relaying them to the file system 610.

The filter driver 605 determines which volume contains the file, the file itself, the offset where the change begins, and the size of the change (in bytes, e.g., in approximately 4K increments). The filter driver 605 then writes this information (the volume, file, offset and size information) to the change journal component 615. For example, the application 600 may change a file on the file system 610 a first time and then subsequently, a second time. The filter driver 605 tracks both changes by tracking the blocks corresponding to the portions of the file that have changed and stores this information in the change journal 615. One advantage of the filter driver 605 and the change journal component 615 is that they can track multiple changes to a file on the block-level (i.e., changes to multiple blocks) and store such information in the change journal component 615, instead of merely tracking that the file has changed and recording such change.

The filter driver 605 can also track metadata about the changed file and store such metadata in the change journal component 615. For example, the filter driver 605 can track which application or process changed the file, the credentials (e.g., security or authentication information) of the user utilizing the application or the credentials (e.g., security or authentication information) of the process that changed the file, the time of the change or other metadata. The filter driver 605 can then store such metadata in the change journal component 615 for use in protecting, transferring or copying data using CDP to the data target 150.

Conclusion

From the foregoing, it will be appreciated that specific embodiments of the portable data protection system have been described herein for purposes of illustration, but that various modifications may be made without deviating from the spirit and scope of the invention. For example, although using the portable data protection system 100 has been described herein with reference to portable devices, the portable data protection system 100 can be used equally well with other systems for which connectivity is occasionally impaired or disk space for saving changes is limited. For example, even desktop systems in an organization may occasionally be disconnected from the network, and the portable data protection system 100 can be used to keep an up-to-date log of all changes that can be sent to the data target 150 when connectivity is restored. Thus, the portable data protection system 100 may apply not only to laptops, but also to wireless devices (e.g., cell phones/mobile phones, pocket computers, tablet computers, portable media players, handheld game devices, etc.), desktop devices for which network connectivity may be an issue, to other systems for which storage space is limited, or to other computing systems. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A portable device for replicating changes to data stored on the portable device to a data target, the portable device comprising:
   a communication component configured to communicatively couple the portable device to the data target;
   a data store configured to store data;
   a change detection component configured to, when the portable device is not communicatively coupled to the data target:
   receive an indication from the communication component indicating that the portable device is not communicatively coupled to the data target; and
   in response to the indication, detect changes to data stored in the data store;
   a change log component configured to:
   when the change detection component detects a change to data stored in the data store, receive an indication from the change detection component indicating the change to the data; and
   in response to the indication, store information in a data structure that indicates the detected change to the data; and
   a change replication component configured to, when the portable device is communicatively coupled to the data target:
   receive an indication from the communication component indicating that the portable device is communicatively coupled to the data target;
   in response to the indication, access the information stored in the data structure; and
   copy the change to the data indicated by the information to the data target;
   wherein the data store has blocks having sizes and the data structure is a bitmap, and wherein each bit of the bitmap is associated with a block of data stored in the data store, and the size of each block is determined based on a size limit of the bitmap.

2. The portable device of claim 1, further comprising an intermediate version cache component, wherein the change detection component is further configured to, when the portable device is not communicatively coupled to the data target:
   determine the data stored in the data store that is to be changed prior to the change to the data; and
   provide the data that is to be changed prior to the change to the intermediate version cache component,
   wherein the intermediate version cache component is configured to:
   receive the data that is to be changed prior to the change from the change detection component; and
   store the data that is to be changed prior to the change.

3. The portable device of claim 1 wherein the portable device is selected from the group consisting of a laptop, a cell phone, a pocket computer, a tablet computer, a portable media player, and a handheld game device.

4. The portable device of claim 1 wherein a portion of the data store is available for data storage, and wherein the change log component is further configured to:
   access the data store to determine the portion available for data storage; and
   when the portion available for data storage exceeds a threshold amount, store additional information associated with the change to the data, wherein the additional information includes at least one of:
   the data to which the change was detected;
   blocks associated with the change to the data;
   an offset within the data to which the change was detected indicating the commencement of the change;
   a length of the change; and
   metadata associated with the data to which the change was detected.

5. A computer-implemented method for tracking modifications made to data objects stored on a portable device, the method comprising:
   determining when the portable device is connected to a data target, wherein the portable device stores data objects, and wherein the data target is configured to store copies of data objects from the portable device; and when it is determined that the portable device is not connected to the data target, at the portable device:
receiving an indication of a modification made to a data object stored on the portable device;
determining information associated with the modification made to the data object; and
storing the associated information in a data structure, wherein the data structure is configured to enable retrieval of the associated information from the data structure and to enable determination of the modification made to the data object based on the associated information;

wherein the portable device includes a file system and a continuous data protection filter configured to monitor modifications to the file system, and further wherein receiving an indication of a modification includes:
monitoring a modification to a data object on the file system, wherein the monitoring is performed by the continuous data protection filter; and
storing an indication of the modification monitored by the continuous data protection filter.

6. The method of claim 5, further comprising when it is determined that the portable device is connected to the data target:
retrieving the associated information from the data structure;
determining the modification made to the data object based on the associated information; and
copying the modification to the data target.

7. The method of claim 5, further comprising when the portable device is connected to the data target:
receiving an indication of a modification made to a data object stored on the portable device; and
copying the modification to the data target.

8. The method of claim 5 wherein the portable device includes a storage device having blocks, and further wherein determining information associated with the modification includes identifying an offset and a number of blocks changed from the offset.

9. The method of claim 5, further comprising when it is determined that the portable device is not connected to the data target, at the portable device, storing an indication of the state of the data object prior to the modification to the data object.

10. The method of claim 5 wherein the portable device includes a storage device having an available amount of storage, and further wherein storing the associated information includes:
determining the available amount of storage on the storage device of the portable device; and
when the available amount of storage exceeds a threshold amount:
determining additional information associated with the modification made to the data object, wherein the additional information includes at least one of:
the data object to which the modification was made;
an offset within the data object to which the modification was made indicating the commencement of the modification;
a length of the modification; and
metadata associated with the data objection to which the modification was made; and
storing the additional information.

11. The method of claim 5 wherein determining when the portable device is connected to the data target includes:
sending a message from the portable device to the data target; and
receiving a response to the message from the data target at the portable device.

12. The method of claim 5, further comprising when it is determined that the portable device is not connected to the data target, at the portable device:
storing the associated information in a cache prior to storing the associated information in the data structure; and
upon receiving a second indication of a second modification made to a second data object:
flushing the cache to store the associated information in the data structure;
determining second information associated with the second modification made to the second data object; and
storing the second associated information in the cache.

13. A computer-readable storage medium encoded with instructions for controlling a computer system to replicate changes from a portable computing system to a data storage system, by a method comprising:
receiving a data structure storing information identifying portions of data objects stored on a portable computing system to which modifications were made;
retrieving the information from the data structure;
based on the retrieved information, determining the portions of data objects to which modifications were made; and
for each determined portion of a data object, copying the modification made to the portion of the data object from the portable computing system to the data storage system;
wherein the portable computing system includes a data store having blocks, wherein the information identifying portions of data objects includes information identifying modified blocks, and
further wherein:
determining the portions of data objects to which modifications were made includes determining modified blocks, offsets within the modified blocks at which the modifications begin, and lengths of modified data within the modified blocks; and
for each determined portion of a data object, copying the modification includes copying only the data within the modified block at the determined offset and length of modified data from the portable computing system to the data storage system.

14. The computer-readable storage medium of claim 13 wherein the data structure is a first data structure, and wherein the method further comprises receiving a second data structure storing information identifying each modification to a portion of a data object.

15. The computer-readable storage medium of claim 13 wherein the method further comprises:
receiving a portion of a data object to which a modification was made prior to the modification; and
storing the portion of the data object to which a modification was made prior to the modification.

* * * * *